United States Patent

Tappan et al.

[11] 4,040,312
[45] Aug. 9, 1977

[54] PLANETARY REDUCTION DRIVE UNIT

[75] Inventors: Harold B. Tappan; John Roy Corwin, both of Richmond, Ind.

[73] Assignee: Eaton Corporation, Cleveland, Ohio

[21] Appl. No.: 518,667

[22] Filed: Oct. 29, 1974

[51] Int. Cl.² .............................................. F16H 1/28
[52] U.S. Cl. ..................................................... 74/801
[58] Field of Search ..................... 74/801, 803, 750 R, 74/391

[56] References Cited

U.S. PATENT DOCUMENTS

| 1,377,864 | 5/1921 | Walter | 74/391 X |
|---|---|---|---|
| 2,709,327 | 5/1955 | Heth | 74/391 X |
| 3,184,985 | 5/1965 | Drietzler | 74/391 X |
| 3,686,978 | 8/1972 | Knoblach et al. | 74/801 |
| 3,812,928 | 5/1974 | Rockwell et al. | 74/801 X |

FOREIGN PATENT DOCUMENTS

| 485,648 | 8/1952 | Canada | 74/801 |

*Primary Examiner*—Samuel Scott
*Assistant Examiner*—Weeley S. Ratliff, Jr.
*Attorney, Agent, or Firm*—Teagno & Toddy

[57] ABSTRACT

A reduction drive unit, such as a wheel hub of the type including a fluid motor operable to rotate a shaft, a sun gear engaging the shaft, a planetary gear set engaging the sun gear, and a ring gear driven by the planetary gears to drive a rotating hub. The rotating hub includes a secondary hub portion surrounding the housing of the fluid motor, with a bearing set and an oil seal disposed between the motor housing and second hub portion. The oil seal has a large enough diameter, relative to the bearing set and adjacent portions of the motor housing and hub portion, that the motor housing may be removed from within the hub without damaging the oil seal. The rotating ring gear is attached to the rotating hub by means of a plurality of bolts, alternate ones of which are body fitting bolts which attach the rotating ring gear directly to the hub, while the remainder of the bolts pass through the cover as well as the rotating ring gear and hub, to permit removal of the cover without movement of the rotating ring gear. The drive shaft, which is normally in driving engagement with the sun gear, may be removed, without removing the sun gear, and reinserted in a reversed orientation, thus permitting the planetary gear set to freewheel relative to the fluid motor, for example, to permit towing of the vehicle.

12 Claims, 3 Drawing Figures

4,040,312

PLANETARY REDUCTION DRIVE UNIT

BACKGROUND OF THE DISCLOSURE

The present invention relates to planetary reduction drive units, and more particularly, to such reduction drive units which include a fluid motor and are adapted for use with a vehicle wheel.

Reduction drive units of the type to which the present invention relates generally comprise a drive motor, a shaft means driven by the motor and a reduction gear train driven by the shaft means, and in turn, driving a wheel hub. Such reduction drive units are well known in the art and are exemplified by U.S. Pat. Nos. 3,686,978 and 3,737,000.

The drive unit illustrated in the cited patents has the drive motor and reduction gearing axially separated by the shaft means surrounded by a hollow spindle extending from the drive unit. Such an arrangement results in a unit which is excessive in axial length, requires a separate spindle and motor housing, in addition to the rotating hub assembly, and requires separate mountings and the like on the rotating hub and motor spindle. The illustrated arrangement effectively limits the loading to which the unit can be subjected because the bearings are disposed between the spindle and the rotating hub and are necessarily relatively small in diameter, thus limiting the available bearing capacity.

Accordingly, it is an object of the present invention to provide a reduction drive unit which is substantially shorter axially for a given torque output, and which minimizes the number of housings, mounting flanges and associated mounting means.

It is a more specific object of the present invention to provide a reduction drive unit which satisfies the above-stated objects by disposing at least a portion of the rotating hub assembly in surrounding relationship with the drive motor, and positioning the bearings between the drive motor and the rotating hub.

In the design illustrated in the cited prior patents, the main oil seal is disposed between the drive unit spindle and the rotating hub, adjacent the main bearings. Such positioning of the main oil seal makes original assembly of the drive unit more complicated and, typically, if it is necessary to remove the spindle from the rotating hub for field service, the oil seal will probably be destroyed.

Accordingly, it is an object of the present invention to provide a reduction drive unit having a main oil seal disposed between the motor housing and the rotating hub such that the drive motor and housing may be removed from the rotating hub without damage occurring to the oil seal and replacement thereof being required.

It is a more specific object of the present invention to provide a reduction drive unit which accomplishes the above-stated object by means of the drive motor housing having an external surface configured such that the drive motor may be removed from the hub with the oil seal remaining in engagement with the internal surface of the hub, and the portions of the bearing sets remaining in engagement with the motor housing passing through the inside diameter of the oil seal as the drive motor is removed.

Conventional prior art reduction drives have included a plurality of bolts passing through the cover, the rotating ring gear, and into the rotating hub, with the bolts being merely standard clearance bolts, i.e., those having a clearance of about 1/64 of an inch between the bolt and the bore. Because it is these bolts which transmit torque from the rotating ring gear to the rotating hub, the use of standard clearance bolts has permitted the possibility of failure because of stress reversals when the drive unit changes directions. In addition, it has been difficult to inspect or service the reduction gear area in prior art reduction drives, because removal of the bolts securing the cover permits the rotating ring gear to become disengaged from the hub assembly as well as the teeth of the mating planetary gears.

Accordingly, it is an object of the present invention to provide a reduction drive unit including a means for attaching the rotating ring gear and gear cover such that the cover can be removed separately without loosening the ring gear.

The cited patents illustrate several ways of disengaging the reduction gearing from the drive motor. Typically, these disengagement features involve axial shifting of the drive shaft which connects the motor shaft to the sun gear such that the drive shaft is no longer in driving engagement with the sun gear. Disengagement by axial shifting of the drive shaft generally requires a longer drive shaft including longer splined portions as well as some type of mechanism for shifting the drive shaft and maintaining it at each of the desired positions. These arrangements each require the manufacture and assembly of additional apparatus.

Accordingly, it is an object of the present invention to provide a reduction drive unit in which disengagement of the sun gear from the motor shaft may be accomplished in a simple, positive manner, without axial shifting of the drive shaft, and with no additional shifting or positioning mechanisms required.

The above and other objects of the present invention are accomplished by the provision of a reduction drive unit in which the rotating hub assembly includes a wheel mounting flange, a first hub portion and a second hub portion extending from the wheel mounting flange toward the inboard end of the unit, oppositely disposed from the first hub portion. The drive motor includes a motor housing disposed within the second hub portion, the motor housing defining a generally cylindrical external surface and the hub portion defining a generally cylindrical internal surface. A bearing means and an oil seal are disposed between the internal surface and the external surface, the oil seal being disposed between the bearing means and the inboard end of the unit.

In accordance with a more limited aspect of the present invention, the external surface includes first and second external portions and the internal surface includes first and second internal portions, the second portions being disposed between the first portions and the inboard end. The bearing means is disposed between the first internal portion and the first external portion and the oil seal is disposed between the second internal portion and the second external portion, the second external portion having a diameter sufficiently larger than the diameter of the first external portion to permit removal of the motor housing from within the second hub portion and passage of the inner race of the bearing means through the oil seal without damage thereto.

In accordance with another aspect of the present invention, the first hub portion and rotating ring gear define a first plurality of bores and the first hub portion, rotating ring gear and cover member define a second plurality of bores. A first plurality of bolts threadedly engage the first plurality of bores and the second plurality of bolts threadedly engage the second plurality of bores to permit removal of the cover member from the drive unit without loosening the ring gear. Preferably, the first and second pluralities of bolts are arranged in a circumferentially alternating pattern.

In accordance with still another aspect of the present invention, the drive shaft connected to the motor shaft and driving the sun gear has first and second axially disposed end portions, the first portion including means engaging the sun gear and the motor shaft to substantially prevent relative rotation therebetween when the drive shaft is in a first orientation with the first end portion adjacent the motor shaft. The second end portion is configured to extend through the sun gear to permit free, relative rotation between the motor shaft and the sun gear when the drive shaft is in a second orientation with the second end portion adjacent the motor shaft.

DESCRIPTION OF THE PREFERRED EMBODIMENT

Figure 1:
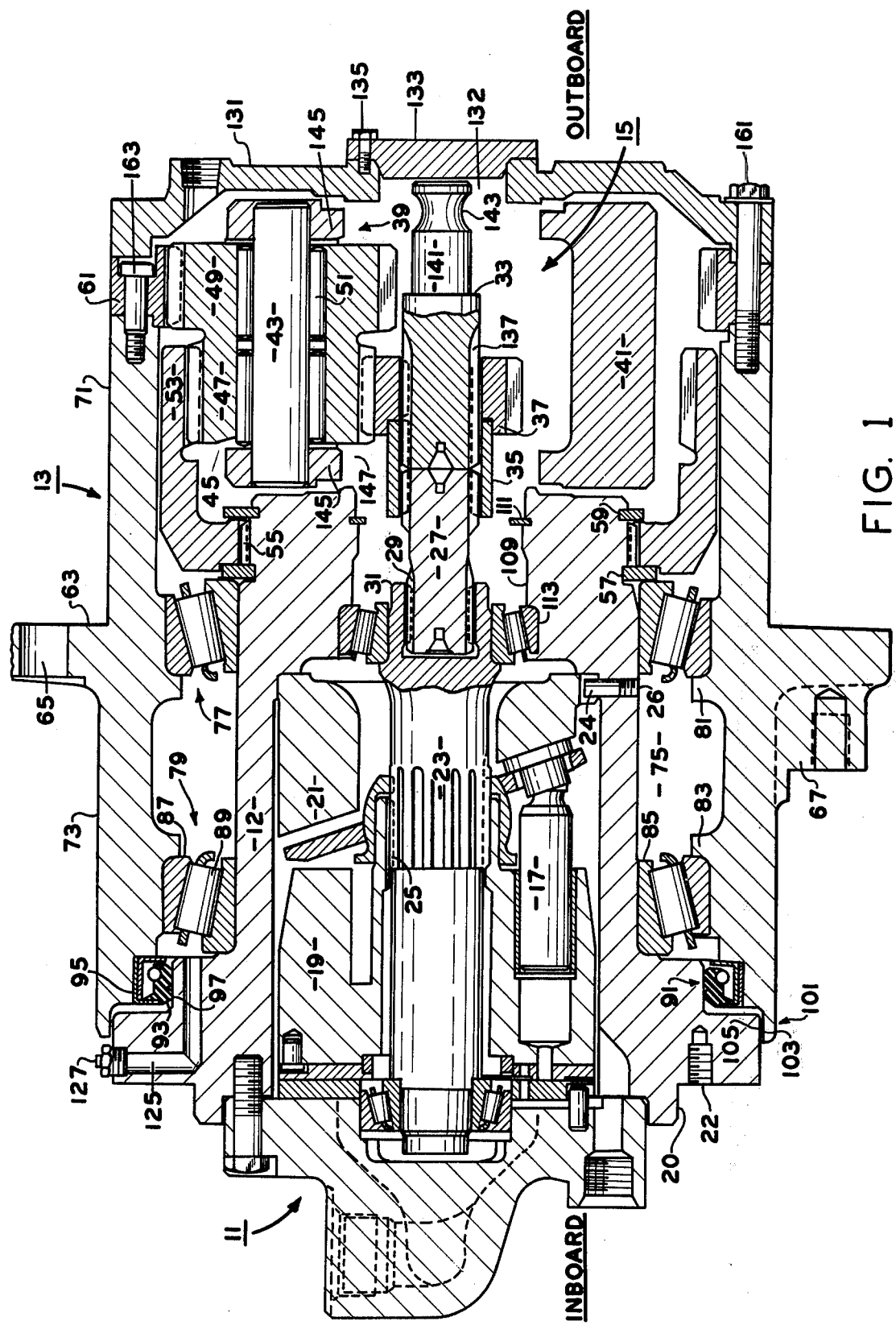
FIG. 1 is an axial cross-section of the reduction drive unit of the present invention.

Referring now to the drawings, which are for the purpose of illustrating a preferred embodiment of the invention, and not for limiting the same, FIG. 1 illustrates a reduction drive unit made in accordance with the teachings of the present invention. It will be appreciated that, although the invention as described hereinafter may be applied to many different types of reduction drive units, it is especially adapted for use with those of the type referred to as "wheel hubs," and will be described in connection therewith. The wheel hub shown in FIG. 1 may be considered as comprising three major components: a drive motor 11, a rotating hub assembly 13; and a reduction gear train 15. Briefly stated, the operation of the wheel hub involves the relatively high speed low-torque rotational output of the drive motor 11 being transmitted to the reduction gear train 15, which reduces the speed of rotation of the output and increases the torque, then transmits this relatively low speed, very high-torque rotational motion to the rotating hub assembly 13.

Referring again to FIG. 1, in more detail, the drive motor 11 is a fluid motor of the type including a motor housing 12 and utilizing a plurality of reciprocating pistons 17 disposed within a piston housing 19, the pistons 17 being in driving engagement with a swash plate 21. The inboard end of motor housing 12 includes a locating journal 20 and a plurality of threaded holes 22 suitable to secure motor housing 12 to a rigid member (not shown) such as a frame member, to render motor housing 12 non-rotatable. In the subject embodiment, the swash plate 21 is prevented from rotating, as by a pin 24 secured by a set screw 26 and the reciprocating movement of the pistons 17 causes the piston housing 19 to rotate, which in turn drives an input shaft (or motor shaft) 23 as by means of a splined connection 25 between the housing 19 and input shaft 23. For purposes of subsequent explanation, it will be assumed that the drive motor 11 is driving the input shaft 23 in a clockwise direction when the reduction drive unit is being viewed from the inboard end (i.e., looking from left to right in FIG. 1).

The rotational output of the input shaft 23 is transmitted to the reduction gear train 15 by a shaft arrangement, including a stub shaft 27 in driving engagement with input shaft 23 by means of a splined connection 29 with a cylindrical portion 31, extending from the outboard end of input shaft 23. In axial alignment with stub shaft 27 is a drive shaft 33, with a splined coupling 35 engaging external splines on both the stub shaft 27 and drive shaft 33. Also in splined engagement with the external splines on drive shaft 33 is a sun gear 37, which transmits torque to a planetary gear set, generally designated 39.

The planetary gear set 39 comprises a planet carrier 41 which carries a plurality of planet shafts 43, in the subject embodiment, there being three of the planet shafts 43. Rotatably mounted on each of the planet shafts 43 is a gear cluster 45, each of which comprises a first planet gear 47 and a second planet gear 49. The first and second planet gears 47 and 49 are illustrated as being integrally formed although it will be appreciated that they may be separate gears, connected to be relatively non-rotatable. Rotatably disposed between the planet gears 47 and 49 and the planet shaft 43 is a plurality of roller bearings 51. The first planet gear 47 is in toothed engagement with both the sun gear 37 and a fixed ring gear 53 which is prevented from rotation by means of a spline connection 55 between the motor housing 12 and the fixed ring gear 53. Axial movement of ring gear 53, relative to the motor housing 12, is substantially prevented by a pair of retaining rings 57 and 59 disposed on opposite sides of the spline connection 55 and seated within grooves formed on the exterior surface of the motor housing 12.

As the sun gear 37 rotates clockwise, each of the planet gears 47 rotates about its axis of rotation in a counterclockwise direction, while rolling about the interior of fixed ring gear 53 in a clockwise direction. In toothed engagement with the planet gear 49 is a rotating ring gear 61, the rotating motion of which represents the output of the reduction gear train 15, and which, in turn, is transmitted to the rotating hub assembly 13. Because the planet gear 49 is larger than planet gear 47, the counterclockwise rotation of planet gear 49 about an axis of rotation which is moving in a clockwise direction causes the rotating ring gear 61 to be driven in a counterclockwise direction. Thus, in the wheel hub of the preferred embodiment, rotary motion of input shaft 23 is converted into rotary motion of the rotating hub assembly 13 at a much slower rotational speed, a much higher torque, and in the opposite direction.

It will be appreciated by those skilled in the art that the sun gear 37 may be replaced by a different sun gear, in meshing engagement with planet gears 49, thus providing a lower gear ratio than that illustrated in FIG. 1.

Preferably, the above-described gearing utilizes an involute tooth profile and the majority of the gearing is allowed to float, thus taking advantage of the self-centering feature of the involute curve to distribute the loads more evenly among the gears. In the subject embodiment, only rotating ring gear 61 is not allowed to float, while the planetary gear set 39 and the sun gear 37 are fully floating and fixed ring gear 53 is semi-floating, i.e., is permitted to float within fixed limits.

Referring still to FIG. 1, the rotating hub assembly 13 includes a wheel mounting flange 63 to which a wheel (not shown) may be mounted by means of a plurality of bolt bores 65. Disposed adjacent the wheel mounting flange 63 is a disc brake mounting flange 67 which, in the subject embodiment, does not extend continuously in a circumferential direction, but rather, comprises plurality of separate flanges. The rotating hub assembly 13 further comprises a hub portion 71 extending from the flange 63 toward the outboard end and a hub portion 73 extending from the flange 63 toward the inboard end. Each of the hub portions 71 and 73 is substantially annular and the hub portion 73 and motor housing 12 define an annular chamber 75 therebetween. The rotating hub assembly 13 is mounted for rotation about the motor housing 12 by means of tapered roller bearing sets 77 and 79, roller bearing set 77 being axially restrained between retaining ring 57 and an inwardly extending shoulder 81 while roller bearing set 79 is similarly restrained against axial movement by the housing 12 and inwardly extending shoulder 83. Because the motor housing 12 is surrounded by the rotating hub assembly 13, rather than being axially disposed therefrom, the wheel hub of the present invention is typically 30 to 40% shorter than prior art wheel hubs having the same output torque capacity. In addition, it was discovered that this arrangement resulted in another operational improvement. Disposing the motor housing 12 within the hub assembly 13 resulted in the main bearing sets 77 and 79 being disposed about the motor housing 12, and thus being of larger diameter and greater load capacity than in prior art wheel hubs.

Each of the tapered roller bearing sets 77 and 79 include an inner race (cone) 85, an outer race (cup) 87 and a plurality of rollers 89. Toward the inboard end of the wheel hub from the bearing set 79 is the main oil seal assembly 91 comprising a deformable, rubber sealing member 93 disposed within a seal housing 95. Sealing member 93 is in sealing engagement with portion 97 of the external surface of motor housing 12. To facilitate removal of the motor housing 12 such as for service of the wheel hub, the diameter of the surface portion 97 is such that the race 85 and rollers 89 of bearing set 79 are removed with the motor housing 12 and pass through the inner diameter of sealing member 93 without damaging the member 93, while the main oil seal assembly 91 remains seated within hub portion 73. It will be appreciated that the inner diameter defined by sealing member 93 is preferably larger than the diameter defined by the outer periphery of rollers 89, although the sealing member 93 may be deformed slightly (and nondestructively) when the rollers 89 pass therethrough. Not only does the arrangement illustrated for the main oil seal assembly 91 permit removal of the drive motor 11 without damage to the sealing member 93, but also, initial assembly thereof is greatly facilitated.

At the inboard end of hub portion 73 is a flange 101 defining an internal surface 103 which is in a generally parallel, face to face relationship with an external surface 105 defined by the motor housing 12. During rotation of hub portion 73 about motor housing 12, the internal surface 103 and external surface 105 define a space or running clearance between the surfaces 103 and 105, the clearance being small enough to substantially prevent the passage of dirt and dust through the clearance, as any such dust and dirt would damage the rubber sealing member 93. The width of the clearance (i.e., the radial dimension between surfaces 103 and 105) is preferably less than about 0.10 inches (0.254 cm), and in the subject embodiment the clearance is about 0.045 inches (0.11 cm).

Figure 3:
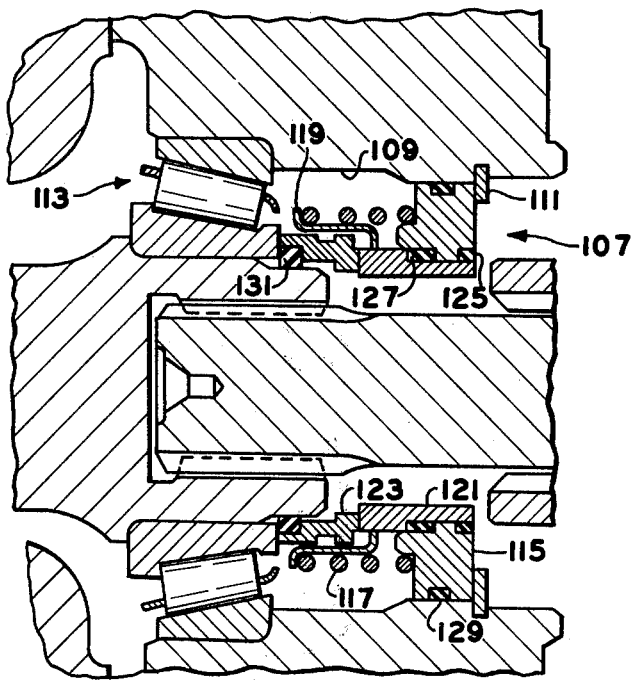
FIG. 3 is a fragmentary cross-section of the face seal assembly of the present invention, also on a scale twice that of FIG. 1.

Referring now to FIGS. 1 and 3, FIG. 3 illustrates a face seal assembly, generally designated 107, which, for purposes of clarity is not shown in FIG. 1, but only in FIG. 3. The motor housing 12 includes a portion at its outboard end which defines a generally cylindrical surface 109 and an annular groove within which is seated a retaining ring 111. Disposed between the inboard end of support surface 109 and the cylindrical portion 31 of input shaft 23 is a tapered roller bearing set 113. For ease of reference, support surface 109, retaining ring 111, and bearing set 113 are all shown on both FIGS. 1 and 3. Referring now to FIG. 3 only, the face seal assembly 107 includes annular sealing ring 115 against which is seated a spring 117, the spring 117 having its other end seated against an outwardly extending portion of a spring retainer 119. Disposed radially inwardly from sealing ring 115 and retainer 119 are sealing rings 121 and 123. Sealing ring 121 operates with sealing ring 115 to sealingly trap oil seals 125 and 127, sealing ring 115 cooperates with support surface 109 to sealingly trap oil seal 129 and sealing ring 123 cooperates with the exterior surface of portion 31 and a side surface of the cone of bearing set 113 to trap oil seal 131. The primary purpose of face seal assembly 107 is to prevent passage of hydraulic fluid from the drive motor 11 into the reduction gear train 15, because typically, hydraulic fluid is an insufficient gear lubricant, and continued operation of the reduction gearing in the hydraulic fluid could damage the gearing.

In view of the close proximity of the drive motor 11 and the reduction gear train 15, and the face that only the face seal assembly 107 prevent passage of the hydraulic fluid into the reduction gearing, it is desirable to have a way of ascertaining the continuing capability of the face seal assembly 107 to seal the hydraulic fluid in drive motor 11, without the necessity of disassembling any portion of the wheel hub. In the subject embodiment, the hydraulic pressure in the drive motor 11 is about 35 to 40 psi, and if leakage occurs at the face seal assembly 107, the hydraulic fluid would flow into the space occupied by the gearing, thus increasing the fluid pressure of the lubricating fluid in annular chamber 75. The main oil seal assembly 91, subjected to the pressure of fluid in annular chamber 75, has a maximum pressure rating of about 7½ psi, above which the seal may be damaged and/or may leak. Thus, in order to signal excessive fluid pressure in annular chamber 75, resulting from either a damaged face seal assembly 107 or excessive heat buildup, there has been provided a passageway 125 in the motor housing 12, communicating fluid pressure in annular chamber 75 to a pressure relief valve 127. In the subject embodiment, pressure relief valve 127 is a standard, poppet-type relief valve, set to relieve any pressure in excess of about 5 psi, sufficiently below the maximum rated pressure of the main oil seal assembly 91 to prevent damage thereto. Preferably, there may be provided a pair of passageways 125 disposed about 180° apart, with one of the passageways containing the pressure relief valve 127 and the other containing a plug (not shown). This provides for various rotational mounting positions of the drive motor 11, while permitting the pressure relief valve to be disposed above the oil level.

Figure 2:
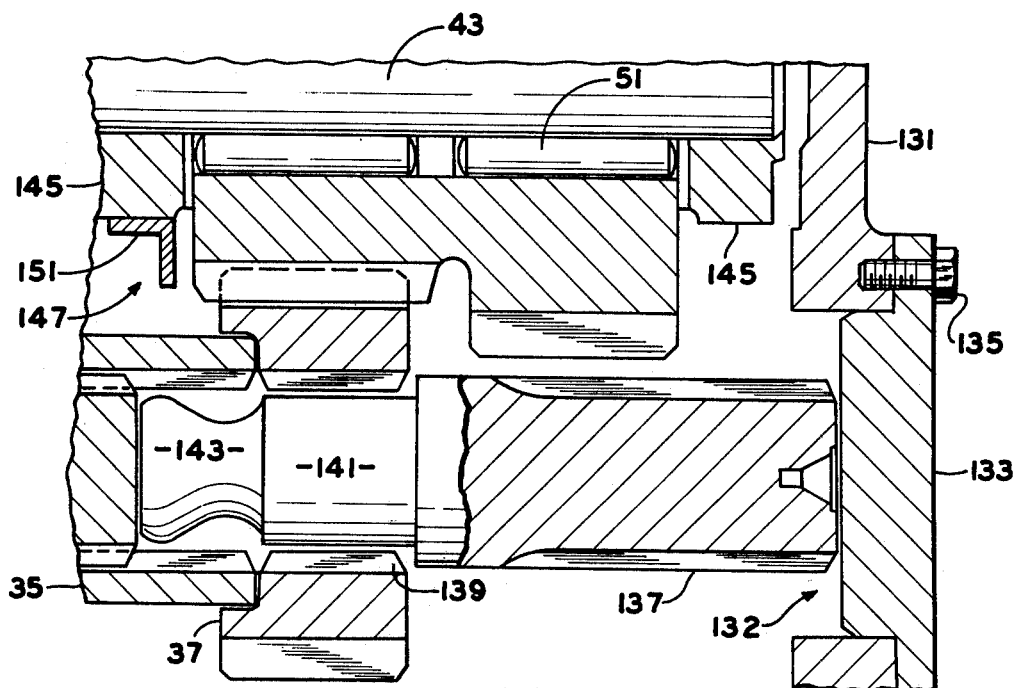
FIG. 2 is a fragmentary cross-section illustrating the disengagement feature of the present invention, on a scale twice that of FIG. 1.

Referring now to FIGS. 1 and 2, it may be seen that the reduction gearing disposed within hub portion 71 and also within rotating ring gear 61 is enclosed on the outboard end by a main cover 131 which defines an opening 132, and a secondary cover 133 attached to the main cover 131 by a plurality of bolts 135. FIG. 2 illustrates the feature of the present invention which permits disengagement of the reduction gear train 15 from the drive motor 11, such that the reduction gearing is able to freewheel, such as when the vehicle is being towed, without the drivemotor 11 still being engaged and thus acting as a brake. FIG. 1 illustrates the engaged orientation of drive shaft 33 in which external splines 137 of drive shaft 33 are in engagement with both the spline coupling 35 and the female splines 139 (shown only in FIG. 2), of sun gear 37. In addition to the large splined portion 137, drive shaft 33 includes a relatively smaller cylindrical portion 141 and a specially configured handle portion 143. In order to disengage the reduction gear train 15 from the drivemotor 11, it is necessary merely to remove the bolts 135 and secondary cover 133, manually grip handle portion 143 and remove drive shaft 33 from its engaged orientation shown in FIG. 1.

With drive shaft 33 removed, the reduction gearing is disengaged from the drive motor and the vehicle may be towed, etc. in this condition. However, in order to eliminate the possibility of losing the drive shaft 33 and also to retain the axial position of the sun gear 37 while the wheel hub is disengaged, it is a feature of the present invention that the drive shaft 33 should be reinserted in the disengaged orientation illustrated in FIG. 2 with the handle portion 143 disposed within spline coupling 35 and cylindrical portion 141 disposed within the female splines 139 of sun gear 37 in loose engagement therewith. It may be appreciated by viewing FIG. 2 that with the drive shaft 33 inserted as shown, there is no driving engagement between the motor and the gearing. Thus, a simple disengagement feature is provided which requires no axial shifting of the drive shaft or other complex positioning mechanism.

Another feature of the present invention is illustrated in FIG. 2, rather than in FIG. 1, for ease of illustrating, and also relates to the servicing of the reduction gearing, and more particularly, to removal of the planetary gear set 39 and sun gear 37 from the outboard end of the wheel hub. During such servicing, it is essential that the sun gear not become disengaged from the mating planet gears 47, especially in wheel hubs of the type shown which utilize clusters of planet gears, rather than single stage planetary gear reduction. As is shown in both FIGS. 1 and 2, the planet carrier 41 includes oppositely disposed end walls 145, and end wall 145 adjacent the face seal assembly 107 defining a central opening 147 which, typically, is larger in diameter than the sun gear 37, for ease of assembly, such that removal of the planet carrier 41 would permit sun gear 37 to pass through the opening 147, thus becoming disengaged from the teeth of planet gear 47. FIG. 2 illustrates an annular retaining member 151 disposed within the opening 147, and extending radially inwardly far enough to engage the end surfaces of sun gear 37, thus preventing disengagement of the sun gear from the planet gear 47. For purposes of maintenance, such as replacing a damaged sun gear, it is preferred that the retaining member 151 not be permanently attached, such as by welding, but instead should be attached by means of a plurality of machine screws (not shown), or may be retained in a press-fit relationship.

Another feature of the present invention which relates to the servicing and inspecting of the reduction gearing is the manner of attaching rotating ring gear 61 and main cover 131 to the rotating hub assembly 13. Hub portion 71, rotating ring gear 61, and main cover 131 define a plurality of circumferentially-spaced bores receiving standard clearance bolts 161, i.e., where the bore and bolt nominally define a 1/64th inch clearance therebetween. Hub portion 71 and rotating ring gear 61 also define a plurality of bores receiving shorter body fitting bolts 163, i.e., where the bore and the bolt define a radial clearance therebetween of about 0.001 – 0.002 inches. The standard clearance bolts 161 and the body fitting bolts 163 are in a circumferentially alternating pattern around the wheel hub. It should be noted that the cover 131 defines no opening in alignment with the bores which contain body fitting bolts 163, such that when the cover 131 is in place, the bolts 163 are not visible. When it is desired to inspect the reduction gear train 15, bolts 161 may be removed, thus permitting the cover 131 to be removed, thus exposing the gearing while the bolts 163 maintain the rotating ring gear 61 in tight engagement with hub portion 71. It should also be noted that body fitting bolts 163 transmit a major amount of the torque to hub portions 71 and the minimum clearance between bolts 163 and the bores defined by hub portion 71 and ring gear 61 decrease the possibility of failure resulting from stress reversals when the direction of rotation of drive motor 11 is reversed.

The invention has been described in detail sufficient to enable one of ordinary skill in the art to make and use the same. Obviously, modifications and alterations of the preferred embodiments will occur to others upon a reading of the specification and it is our intention to include all such modifications and alterations as part of our invention insofar as they come within the scope of the appended claims.

We now claim:

1. A reduction drive unit of the type including a fluid motor including a rotating group operable to rotate a shaft means, a sun gear in engagement with said shaft means for rotation therewith, planetary gear reduction means in driven engagement with said sun gear, a fixed ring gear in engagement with said planetary gear reduction means, an output ring gear driven by said planetary gear reduction means and a rotating hub assembly mounted for rotation with said output ring gear wherein:

a. said rotating hub assembly includes a wheel mounting flange, a first hub portion extending from said wheel mounting flange to said output ring gear, and a second hub portion extending from said wheel mounting flange toward the inboard end of said unit, oppositely disposed from said first hub portion;

b. said fluid motor including a substantially non-rotatable motor housing surrounding said rotating group, said motor housing being disposed within said second hub portion and terminating, at its outboard end, in a support portion disposed about said shaft means;

c. said second hub portion defining a generally cylindrical internal surface and said motor housing defining generally cylindrical external surface, said external surface including first and second external portions and said internal surface including first and second internal portions, said second portions being disposed between said first portions and said inboard end;

d. bearing means including an inner race engaging said first external portion, an outer race engaging said first internal portion and a plurality of bearing members in bearing engagement between said inner race and said outer race;

e. oil seal means including a deformable sealing member in sealing engagement with said second external portion and a seal housing seated in engagement with said second internal portion, said second external portion having a diameter sufficiently larger than that of said first external portion to permit removal of said motor housing from within said second hub portion and passage of at least a portion of said bearing means through said deformable sealing member;

f. said internal surface defined by said second hub portion and said external surface defined by said motor housing cooperating to define an annular chamber in communication with the space occupied by said planetary gear reduction means, said annular chamber terminating at said oil seal means;

g. said motor housing defining a passageway in fluid communication between said annular chamber and the exterior of said motor housing; and h. a pressure relief valve disposed in said passageway and operable to relieve fluid pressure at a pressure substantially below the maximum rated pressure of said oil seal means.

2. A planetary reduction drive unit as recited in claim 1 further including a cover member disposed adjacent the output end of said output ring gear, and a first plurality of bolts holding said output ring gear and said rotating hub assembly in tight engagement, and a second plurality of bolts holding said cover member, said output ring gear and said rotating hub assembly in tight engagement, said first and second pluralities of bolts being in threaded engagement with said rotating hub assembly, to permit removal of said cover member while maintaining said output ring gear in tight engagement with said rotating hub assembly.

3. A planetary reduction drive unit comprising:

a. a fluid motor having a rotating group and including a motor housing adapted to be fixedly mounted;

b. input shaft means driven by said fluid motor;

c. a drive shaft and means coupling said input shaft means and said drive shaft;

d. a sun gear driven by said drive shaft;

e. planetary gear reduction means including a planet carrier, a plurality of planet shafts carried by said planet carrier and a first planet gear and a second planet gear mounted rotatably on each of said planet shafts, each cluster of said first and second planet gears being relatively non-rotatable said sun gear being in meshing engagement with one of said first planet gears and said second planet gears;

f. a fixed ring gear in non-rotatable engagement with said motor housing, said fixed ring gear being in meshing engagement with each of said first planet gears;

g. an output ring gear in meshing engagement with each of said second planet gears to be driven thereby;

h. a rotating hub assembly mounted for rotation with said output ring gear;

i. said drive shaft including first and second axially disposed end portions, said first end portion including means for engaging said sun gear when said drive shaft is in a first orientation with said first end portion adjacent said input shaft means, said second end portion being configured to extend through said sun gear to permit relative rotation between said sun gear and said second portion when said drive shaft is in a second orientation with said second end portion disposed adjacent said input shaft means;

j. said planet carrier including an end wall on the inboard end thereof, said end wall defining an opening having a diameter larger than the diameter of said sun gear;

k. a retaining member disposed within said opening and extending radially inwardly to define an inner diameter smaller than that of said sun gear;

l. a cover member disposed adjacent the outboard end of said output ring gear; and m. a first plurality of bolts holding said output ring gear and said rotating hub assembly in tight engagement, and a second plurality of bolts holding said cover member, said output ring gear and said rotating hub assembly in tight engagement, said first and second pluralities of bolts being in threaded engagement with said rotating hub assembly, to permit removal of said cover member while maintaining said output ring gear in tight engagement with said rotating hub assembly.

4. A reduction drive unit of the type including a fluid motor having a rotating group operable to rotate a shaft means, sun means in engagement with said shaft means for rotation therewith, planetary gear reduction means in engagement with said sun gear means, a fixed ring gear in engagement with said planetary gear reduction means, an output ring gear driven by said planetary gear reduction means and a rotating hub assembly mounted for rotation with said output ring gear, said reduction drive unit further comprising:

a. said rotating hub assembly including a wheel mounting flange, a first hub portion extending from said wheel mounting flange to said output ring gear and a second hub portion extending from said wheel mounting flange towards the inboard end of said unit, oppositely disposed from said first hub portion;

b. said fluid motor including a substantially non-rotatable motor housing surrounding said rotating group, said motor housing disposed within said second hub portion, and fixedly connected to said fixed ring gear;

c. said second hub portion defining a generally cylindrical internal surface and said motor housing defining a generally cylindrical external surface, said external surface including first and second external, generally cylindrical portions and said internal surface includes first and second, generally cylindrical portions, said second external portion being disposed between said first external portion and the inboard end of said external surface, and said second external portion being disposed between said first internal portion and said inboard end of said second hub portion, said second hub portion terminates towards the inboard end thereof and a flange portion including a third internal portion, said external surface defining a third external portion, said third internal portion and said external portion being disposed in a generally parallel, face-to-face relationship defining a running clearance therebetween, said clearance being sufficiently small to minimize passage of foreign matter therethrough; and d. a bearing means and an oil seal means disposed between said internal surface and said external surface.

5. A reduction drive unit as defined in claim 4 wherein said running clearance has a radial dimension less than about 0.10 inch (0.254 cm).

6. A reduction drive unit of the type including a fluid motor having a rotating group operable to rotate a shaft means, sun gear means in engagement with said shaft means for rotation therewith, planetary gear reduction means in engagement with said sun gear means, a fixed ring gear in engagement with said planetary gear reduction means, an output ring gear driven by said planetary gear reduction means and a rotating hub assembly mounted for rotation with said output ring gear, said reduction drive unit further comprising:

a. said rotating hub assembly including a wheel mounting flange, a first hub portion extending from said wheel mounting flange to said output ring gear and a second hub portion extending from said wheel mounting flange toward the inboard end of said unit, oppositely disposed from said first hub portion;

b. said fluid motor including a substantially nonrotatable motor housing surrounding said rotating group, said motor housing disposed within said second hub portion, and fixedly connected to said fixed ring gear, said motor housing terminates, at its outboard end, in a shaft support portion defining a support surface disposed about said shaft means and including a face seal assembly disposed in sealing engagement between said support surface and said shaft means;

c. said second hub portion defining a generally cylindrical internal surface and said motor housing defining a generally cylindrical external surface; and d. a bearing means and an oil seal means disposed between said internal surface and said external surface.

7. A reduction drive unit as defined in claim 6 wherein said face seal assembly prevents passage of fluid from said fluid motor into the space occupied by said planetary gear reduction means.

8. A reduction drive unit as defined in claim 7 wherein said internal surface defined by said second hub portion and said external surface defined by said motor housing cooperate to define an annular chamber in communication with said space occupied by said planetary gear reduction means, said annular chamber terminating, toward the inboard end thereof, at said oil seal means.

9. A reduction drive unit as defined in claim 8 wherein one of said motor housing and said second hub portion define a passageway in fluid communication between said annular chamber and a pressure relief valve.

10. A reduction drive unit as defined in claim 9 wherein said oil seal means has a maximum rated pressure to which said oil seal means may be subjected and said pressure relief valve is operable to relieve fluid pressure within said passageway at a pressure below said maximum rated pressure.

11. A reduction drive unit of the type including a fluid motor having a rotating group operable to rotate a shaft means, sun gear means in engagement with said shaft means for rotation therewith, planetary gear reduction means in engagement with said sun gear means, a fixed ring gear in engagement with said planetary gear reduction means, an output ring gear driven by said planetary gear reduction means and a rotating hub assembly mounting for rotation with said output ring gear, said reduction drive unit further comprising:

a. said rotating hub assembly including a wheel mounting flange, a first hub portion extending from said wheel mounting flange to said output ring gear and a second hub portion extending from said wheel mounting flange toward the inboard end of said unit, oppositely disposed from said first hub portion;

b. said fluid motor including a substantially non-rotatable motor housing surrounding said rotating group, said motor housing disposed within said second hub portion, and fixedly connected to said fixed ring gear;

c. said second hub portion defining a generally cylindrical internal surface and said motor housing defining a generally cylindrical external surface;

d. a bearing means and an oil seal means disposed between said internal surface and said external surface;

e. said shaft means includes input shaft means driven by said fluid motor, a drive shaft having first and second axially disposed end portions and means coupling said input shaft and said drive shaft, said sun gear means being in engagement with said drive shaft to be driven by said drive shaft;

f. said planetary gear reduction means includes a planet carrier supporting a plurality of planet shafts;

g. each of said planet shafts having a cluster of first and second planet gears mounted rotatably thereon, said planet gears in each of said clusters being relatively non-rotatable, said first planet gears being in meshing engagement with said fixed ring gear and said second planet gears being in meshing engagement with said output ring gear;

h. said first end portion including means for engaging said sun gear and said coupling means to substantially prevent relative rotation therebetween when said drive shaft is in a first orientation with said first end portion disposed adjacent said coupling means;

i. said second end portion being configured to extend through said sun gear to permit substantially free, relative rotation between said coupling means and said sun gear when said drive shaft is in a second orientation with said second end portion disposed adjacent said coupling means; and j. including first and second cover members, said output ring gear being disposed between said first cover and said first hub portion, said second cover member being operable to engage said first cover member and being removable to provide access to said second end portion of said drive shaft when said drive shaft is in said first orientation.

12. A reduction drive as defined in claim 11 wherein:

a. said planetary gear reduction means comprises a planet carrier having an end wall portion on the inboard end thereof defining an opening sufficiently large to permit said sun gear means to pass through said opening during removal of said planet carrier from said reduction drive; and b. a retaining member disposed within said opening and extending radially inwardly to prevent passage of said sun gear means and out of engagement with said planetary gear reduction means.

* * * * *

UNITED STATES PATENT AND TRADEMARK OFFICE
CERTIFICATE OF CORRECTION

PATENT NO. : 4,040,312

DATED : August 9, 1977

INVENTOR(S) : Harold B. Tappen; John Roy Corwin

It is certified that error appears in the above-identified patent and that said Letters Patent are hereby corrected as shown below:

| | |
|---|---|
| Col. 4, line 19: | Insert (3) after the word "three". |
| Col. 6, line 34: | "face" should read "fact". |
| Col. 7, line 40: | "illustrating" should read "illustration". |
| Col. 12, line 1: | "ring" should appear before "gear". |
| line 3: | "mounting" should read "mounted". |

Signed and Sealed this

Sixth Day of December 1977

[SEAL]

Attest:

RUTH C. MASON
Attesting Officer

LUTRELLE F. PARKER
Acting Commissioner of Patents and Trademarks